United States Patent [19]

Kimura et al.

[11] Patent Number: 5,350,047

[45] Date of Patent: Sep. 27, 1994

[54] ROTARY VALVE FOR AUTOMATIC TRANSMISSION

[75] Inventors: Koichi Kimura; Kazuma Hatakeyama; Hideo Furukawa, all of Wako, Japan

[73] Assignee: Honda Giken Kogyo Kabushkiki Kaisha, Tokyo, Japan

[21] Appl. No.: 155,273

[22] Filed: Nov. 22, 1993

Related U.S. Application Data

[63] Continuation of Ser. No. 871,431, Apr. 21, 1992, abandoned.

[30] Foreign Application Priority Data

Apr. 23, 1991 [JP] Japan .................................. 3-092146
Jul. 31, 1991 [JP] Japan .................................. 3-192301

[51] Int. Cl.$^5$ .............................................. F16D 25/10
[52] U.S. Cl. ............................ 192/87.13; 192/87.19; 137/625.23; 251/129.11
[58] Field of Search ................. 192/87.13, 87.1, 87.18, 192/87.19; 137/625.23, 625.24, 625.16; 251/129.11

[56] References Cited

U.S. PATENT DOCUMENTS

| | | | |
|---|---|---|---|
| 1,897,591 | 2/1933 | Scholz | 137/625.24 X |
| 2,598,848 | 6/1952 | Snyder | 251/113 |
| 2,849,887 | 9/1958 | Knowles | 192/87.19 X |
| 3,021,869 | 2/1962 | Ross | 137/625.24 |
| 3,151,718 | 10/1964 | Temple | 192/87.13 X |
| 3,217,744 | 11/1965 | Racicot | 137/625.24 |
| 3,468,194 | 9/1969 | Horsch et al. | 192/87.13 X |
| 3,650,295 | 3/1972 | Smith | 137/625.24 X |
| 3,752,281 | 8/1973 | Arnold | 192/87.19 |
| 3,815,632 | 6/1974 | Bliss | 137/625.24 |
| 4,096,882 | 6/1978 | Yano et al. | 192/87.19 X |
| 4,324,274 | 4/1982 | Golan et al. | 192/87.13 X |
| 4,465,167 | 8/1984 | Fujioka | 137/625.23 X |
| 4,499,922 | 2/1985 | Tanguy | 137/625.24 |
| 4,759,420 | 7/1988 | Schipper, Jr. et al. | 137/625.24 X |
| 4,836,249 | 6/1989 | LaPointe | 137/625.23 |
| 4,838,145 | 6/1989 | Slocum et al. | 137/625.24 X |
| 4,966,192 | 10/1990 | Umeda | 137/625.23 |
| 5,131,431 | 7/1992 | Yullmahn | 137/625.23 |
| 5,137,257 | 8/1992 | Tice | 251/129.11 |

FOREIGN PATENT DOCUMENTS

| | | |
|---|---|---|
| 1425632 | 10/1968 | Fed. Rep. of Germany . |
| 2516154 | 10/1976 | Fed. Rep. of Germany ................ 137/625.24 |
| 8802280 | 5/1988 | Fed. Rep. of Germany . |
| 1476472 | 2/1967 | France . |
| 2054694 | 5/1971 | France . |
| 63-312577 | 12/1988 | Japan . |
| 0670756 | 4/1952 | United Kingdom ........... 137/625.24 |

OTHER PUBLICATIONS

European Search Report.

Primary Examiner—Vinh T. Luong
Assistant Examiner—Andrea Pitts
Attorney, Agent, or Firm—Armstrong, Westerman, Hattori, McLeland & Naughton

[57] ABSTRACT

An oil passage is provided in an axially central portion of a spool which is received within a valve housing and rotatively driven by a pulse motor, and oil passages passed diametrically through the spool and connected to the oil passage, so that a hydraulic pressure from an input port connected to a hydraulic pressure source is selectively supplied to the oil passages for selectively engaging and disengaging frictionally engaging elements of an automatic transmission. An axially acting load provided by the hydraulic pressure is received by a thrust bearing mounted at an end of the spool. The supply of oil from the axial portion of the spool enables no side force to be applied, thereby reducing the frictional force and to enhance the sealability between the valve housing and the spool.

7 Claims, 14 Drawing Sheets

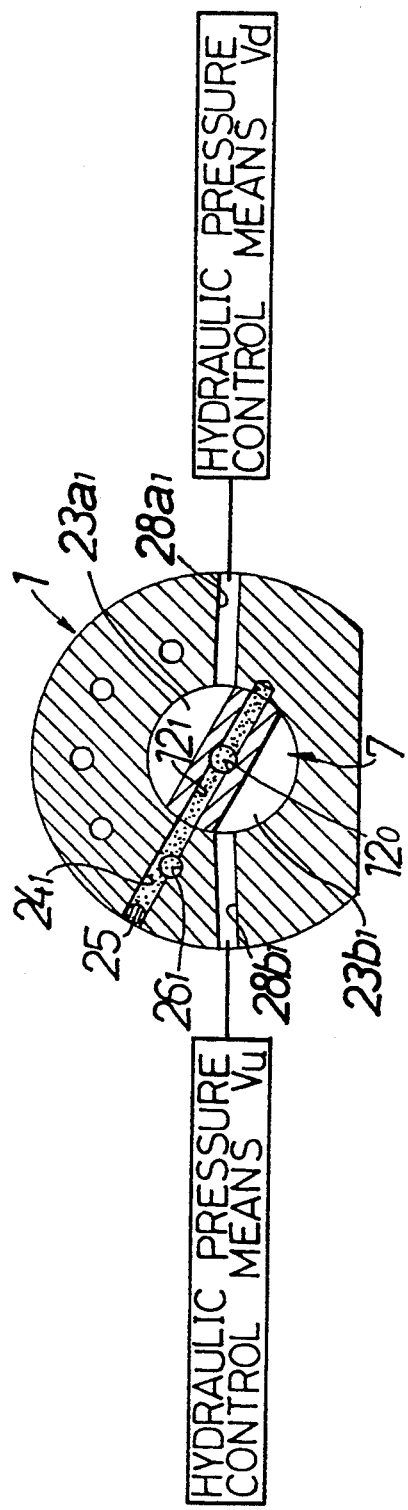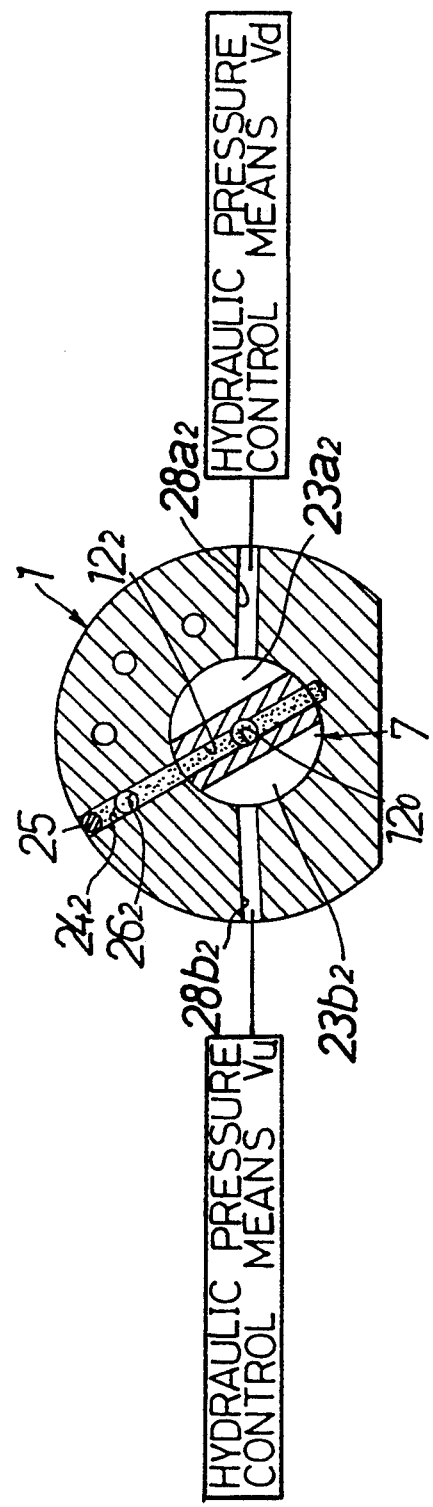

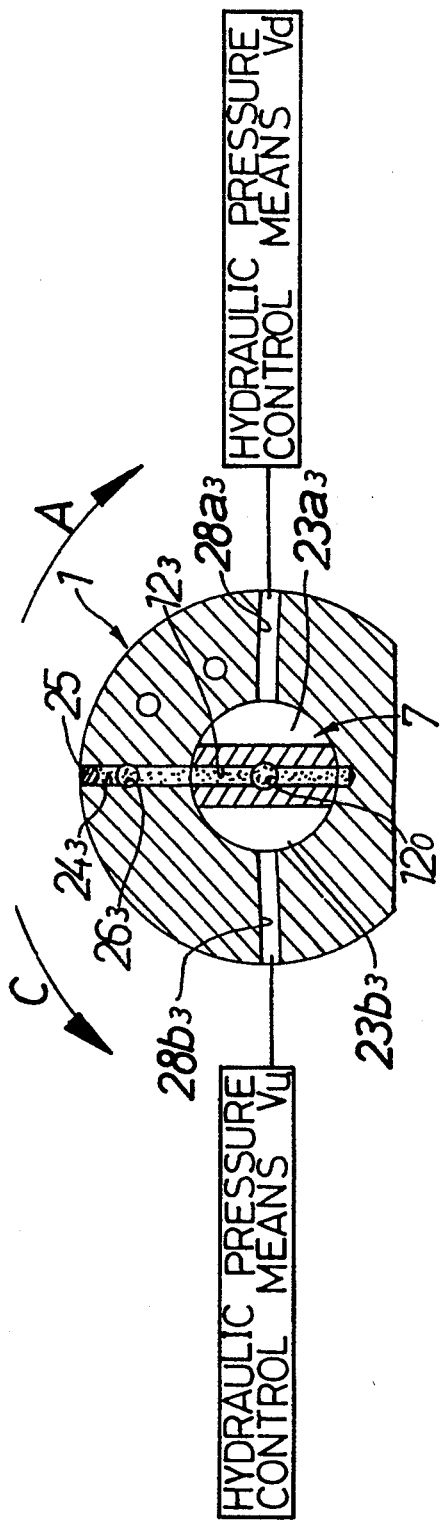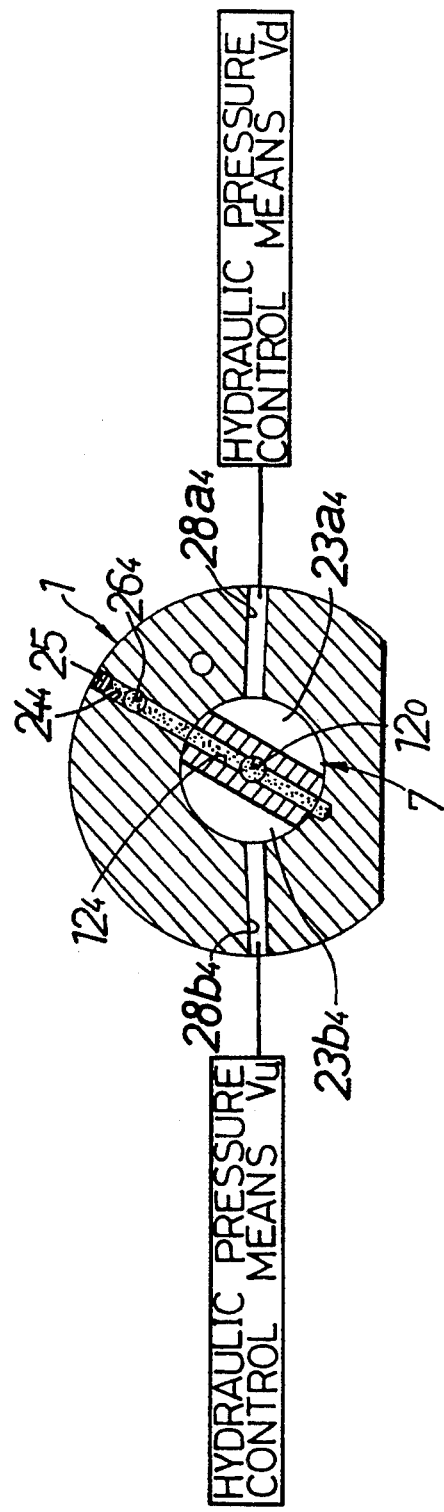

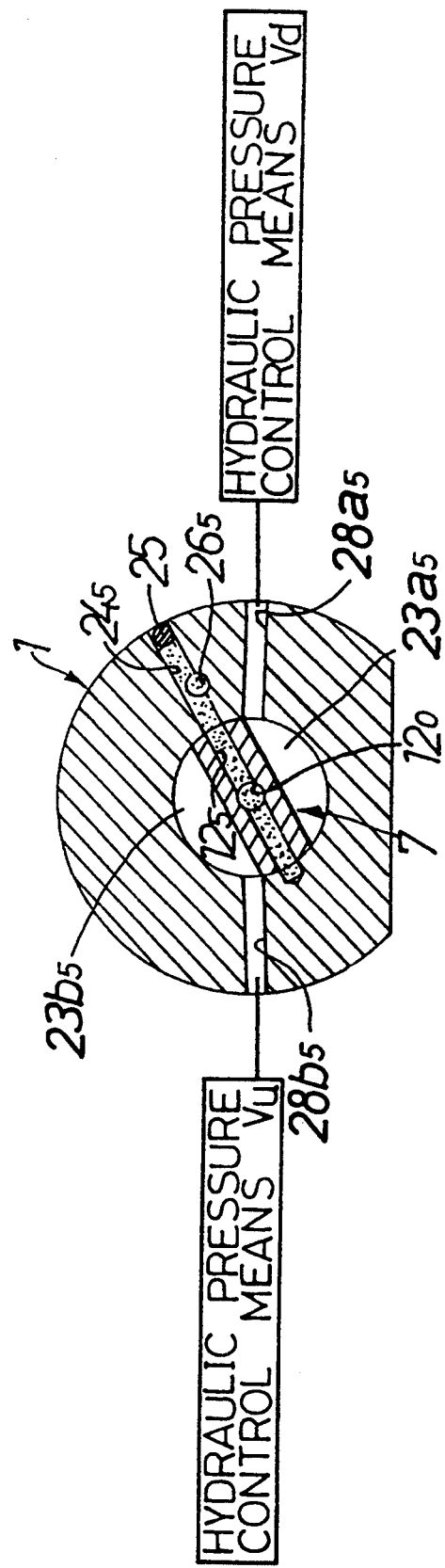

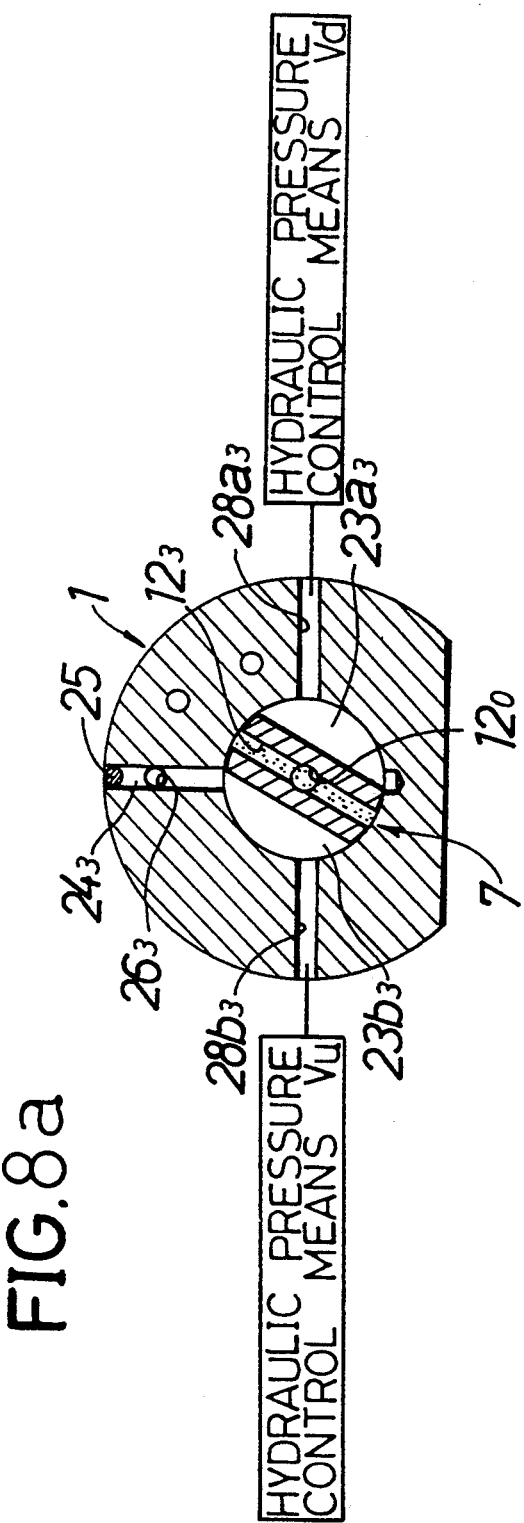

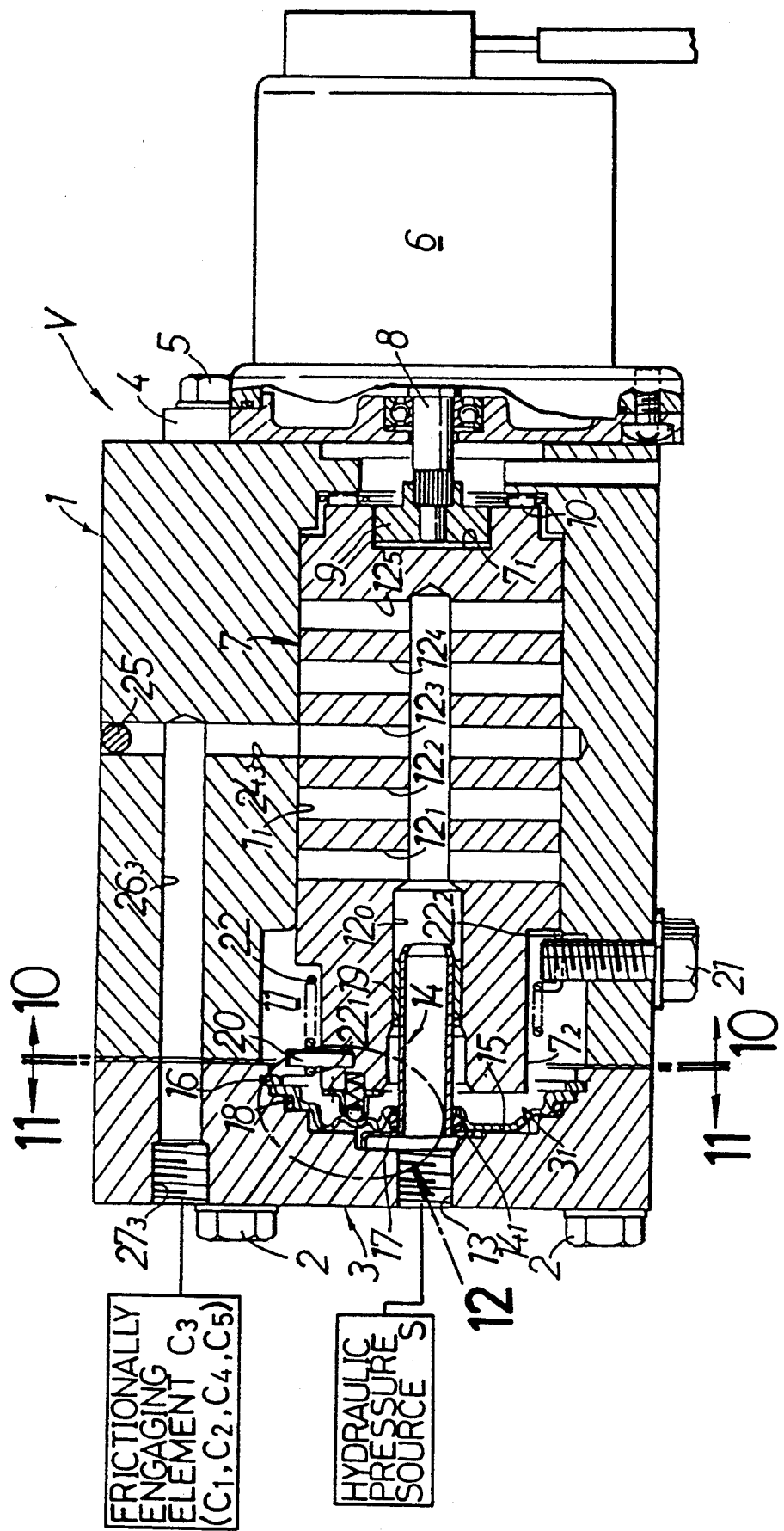

ROTARY VALVE FOR AUTOMATIC TRANSMISSION

This application is a continuation of application Ser. No. 07/871,431, filed Apr. 21, 1992, now abandoned.

BACKGROUND OF THE INVENTION

1. Field of the Invention

The invention generally relates to a rotary valve for an automatic transmission, comprising a spool rotatably received within a valve housing and adapted to be rotatively driven by an actuator, so that a hydraulic pressure from a hydraulic pressure source is selectively supplied to each of a plurality of frictionally engaging elements through the spool.

2. Description of the Prior Art

There are such conventionally known rotary valves for automatic transmissions as described, for example, in Japanese Patent Application Laid-open No. 312577/88.

Such a prior art conventional rotary valve for the automatic transmission suffers from a problem that line pressure supplied from the hydraulic pressure source through an input port formed in the valve housing is applied to an outer side surface of the spool from a radial direction and, for this reason, an opposite outer side surface of the spool is urged against an inner peripheral surface of a valve bore of the valve housing and, as a result, smooth rotation of the spool is prevented.

To avoid such a disadvantage, it can be conceived that a circumferential groove, to which the line pressure is transmitted, is formed in an outer peripheral surface to balance side force. However, the provision of such a circumferential groove results not only in an increased fabrication cost for the spool, but also in a problem of sealing between an oil passage opened into the peripheral surface of the spool and the Circumferential groove. Therefore, it is necessary to prolong the axial size of the spool to insure a sealing length, and to reduce the clearance between the spool and the valve housing to prevent leakage of oil. Such a construction, as described above, causes new problems that the entire length of the spool is increased, resulting in an increase in size of the entire rotary valve, and frictional force between the spool and the valve housing is increased. Hence, the size of a driving pulse motor must be increased.

In the prior art rotary valve, in order to cope with the situation where the spool becomes non-rotatable for any reason, such as, a malfunction of the pulse motor, for rotatively driving the spool, and a clogging with dust particles, measure is taken, such as, means for providing small vibration to the spool for preventing any sticking of spool, and a provision of an emergency valve. This causes a complication of the structure and an increase in cost. In addition, the spool of the rotary valve includes a plurality of axially arranged oil passages and, therefore, if the distance between adjacent oil passages is diminished, to reduce the axial size, it is necessary to conduct precise axial positioning of the spool.

Further, in the prior art rotary valve, when hydraulic pressure is being supplied to an intended frictionally engaging element, the hydraulic pressure for the other frictionally engaging elements is released through the rotary valve. The releasing of the hydraulic pressure is carried out through a common path during either downshifting or upshifting. In order to moderate shifting shock during downshifting and upshifting, it is desirable that during upshifting, the releasing of the hydraulic pressure from the frictionally engaging element, which has been in engagement theretofore, is retarded to permit the two engaging elements to be brought into a co-engagement. It is desirable that during downshifting, the releasing of the hydraulic pressure from the frictionally engaging element, which has been in engagement theretofore, is expedited to temporarily produce a neutral condition, thereby increasing the number of revolutions of engine to a proper extent. In the prior art rotary valve, however, the path through which the hydraulic pressure is released is common during both upshifting and downshifting and, therefore, it is difficult to provide different dropping characteristics of the hydraulic pressure during upshifting and downshifting.

SUMMARY OF THE INVENTION

Accordingly, it is an object of the present invention to provide a rotary shaft for an automatic transmission, wherein the spool can be smoothly rotated, and a sealability can be easily insured.

To achieve the above first object, according to a first aspect and feature of the present invention, there is provided a rotary valve for an automatic transmission, comprising a spool rotatably received within a valve housing and adapted to be rotatively driven by an actuator, so that a hydraulic pressure from a hydraulic pressure source is selectively supplied to each of a plurality of frictionally engaging elements through the spool, wherein the rotary valve includes a central oil passage formed in the spool to extend along an axis of rotation of the spool, a radial oil passage formed in the spool to extend axially symmetrically and radially from the central oil passage, and an oil supply port opened into an axial end of the central oil passage.

With the first feature of the present invention, a side force is prevented from acting on the spool and, as a result, the frictional force between the spool and the valve housing is reduced, ensuring that the spool can be positively driven by a slight driving force. Moreover, hydraulic pressure is supplied from an axial end of the spool and, therefore, any leakage of the hydraulic pressure can be prevented without specifically enhancing the sealability between the spool and the valve housing.

In addition to the first feature, a second feature of the present invention is that the rotary valve further including a thrust bearing mounted between the spool and the valve housing for receiving load axially acting on the spool.

With the second feature of the present invention, the spool can be smoothly rotated under an action of the axial load. Moreover, the spool urged axially is positioned by the thrust bearing and, therefore, the axial positional relationship between the spool and the valve housing is always kept constant.

In addition to the first feature, a third feature of the present invention is that the rotary valve further includes a feed pipe connected to a hydraulic pressure source and inserted into the central oil passage.

With the third feature of the present invention, hydraulic pressure from the hydraulic pressure source can be reliably supplied to the spool with a simple structure.

In addition to the third feature, a fourth feature of the present invention is that the rotary valve further includes a bushing mounted between an outer periphery of the feed pipe and an inner periphery of the central oil passage in the spool.

With the fourth feature of the present invention, any leakage of hydraulic pressure can be prevented without disturbing the rotation of the spool.

In addition, it is a second object of the present invention to appropriately define a rotational position and an axial position for the spool of the rotary valve.

To achieve the second object, according to a fifth aspect and feature of the present invention, there is provided a rotary valve for an automatic transmission, comprising a spool rotatably received within a valve housing and adapted to be rotatively driven by an actuator, so that hydraulic pressure from a hydraulic pressure source is selectively supplied to each of a plurality of frictionally engaging elements through the spool, wherein the rotary valve includes a resiliently biasing means provided at an axial end of the spool for biasing the spool in a rotational direction thereof.

With the fifth feature of the present invention, it is possible to restrain the spool in a predetermined rotational position by resilient biasing means, when the actuator malfunctions.

In addition to the fifth feature, a sixth feature of the present invention is that the resilient biasing means comprises a coil spring, with opposite ends of the spring being engaged with a locking portion provided in the spool and a locking portion provided in the valve housing, respectively.

With the sixth feature of the present invention, it is possible to bias the spool in the rotational direction with a simple structure.

In addition to the sixth feature, a seventh feature of the present invention is that the locking portion provided in the valve housing also serves as a stopper for defining an end of rotation of the spool.

With the seventh feature of the present invention, the end of rotation of the spool can be defined without use of a special stopper.

In addition to any of the fifth to seventh features, an eighth feature of the present invention is that the rotational position of the spool, biased by the resilient biasing means, corresponds to a neutral stage or a higher gear shift stage of the automatic transmission.

With the eighth feature of the present invention, the gear shift stage of the automatic transmission can be switched into a desirable position, even if the actuator malfunctions.

In addition, according to a ninth aspect and feature of the present invention, there is provided a rotary valve for an automatic transmission, comprising a spool rotatably received within a valve housing and adapted to be rotatively driven by an actuator, so that a hydraulic pressure from a hydraulic pressure source is selectively supplied to each of a plurality of frictionally engaging elements through the spool, wherein the rotary valve includes a resilient biasing means provided at an axial end of the spool for biasing the spool in an axial direction thereof.

With the ninth feature of the present invention, the spool can be precisely located axially, with the backlash of the spool restrained.

In addition to the ninth feature, a tenth feature of the present invention is that the resilient biasing means is mounted at axially one end of the spool, and a thrust bearing is mounted at the axially other end of the spool.

With the tenth feature of the present invention, the spool can be smoothly rotated under an action of urging force of the resilient biasing means.

In addition to the ninth or tenth feature, an eleventh feature of the present invention is that the resilient biasing means has a positioning member which is fitted into a recess formed in the spool, or the valve housing, to position the spool with respect to the valve housing.

With the eleventh feature of the present invention, the spool can be precisely located in a predetermined rotational position.

Further, it is a third object of the present invention to provide a rotary valve for an automatic transmission, wherein a shifting shock during upshifting and downshifting can be moderated with a simple construction.

To achieve the third object, according to a twelveth aspect and feature of the present invention, there is provided a rotary valve for an automatic transmission, comprising a spool rotatably received within a valve housing for rotative drive by an actuator, so that a hydraulic pressure, from a hydraulic pressure source, is selectively supplied to each of a plurality of frictionally engaging elements through the spool. The rotary valve includes a drain port which is communicatable with selected one of the frictionally engaging elements when the spool is rotated from a predetermined position for permitting the supply of the hydraulic pressure to such selected frictionally engaging element to a position for permitting the supply of the hydraulic pressure to another frictional engaging element for a higher gear shift rotary valve includes drain port, which is communicatable with the selected frictionally engaging element, when the spool is rotated from the predetermined position to a position for permitting the supply of the hydraulic pressure to another frictionally engaging element for a lower gear shift, the drain ports being provided independently.

With the twelveth feature, when the spool is rotatively driven, so that the destination to which the hydraulic pressure is supplied is changed from a certain frictionally engaging element to another frictionally engaging element, the hydraulic pressure for the frictionally engaging element which has been in engagement theretofore, by the earlier supply of hydraulic pressure thereto, is released through the different drains upon rotation of the spool in one direction, e.g., during upshifting and upon rotation of the spool in the other direction, e.g., during downshifting. Therefore, different characteristics of reduction in the hydraulic pressure can be obtained, depending upon the directions of rotation of the spool, by independently controlling the releasing of the hydraulic pressure through the drain ports. In addition, it is possible to achieve the moderation of shifting shock, either during upshifting or during downshifting, with a simple structure.

The above and other objects, features and advantages of the invention will become more apparent from a consideration of the following description of the preferred embodiments, taken in conjunction with the accompanying drawings.

BRIEF DESCRIPTION OF THE DRAWINGS

FIGS. 1 to 8b illustrate a first embodiment of the present invention, wherein

FIG. 1 is a longitudinal sectional view of a rotary valve of the first embodiment;

FIG. 2 is a sectional view taken along a line 2—2 in FIG. 1;

FIG. 3 is a sectional view taken along a line 3—3 in FIG. 1;

FIG. 4 is a view similar to FIG. 3, showing the valve in different position;

FIG. 5 is a perspective view of a spool of the valve of FIG. 1;

FIG. 6 is a view of the development of an outer peripheral surface of the spool of FIG. 5;

FIGS. 7a to 7e are views taken along lines 7a—7a to 7e—7e, respectively, in FIG. 1;

FIGS. 8a and 8b are views similar to FIG. 7c, showing the valve in different position; and FIGS. 9 to 12 illustrate a second embodiment of the present invention, wherein FIG. 9 is a longitudinal sectional view of a rotary valve of the second embodiment;

FIG. 10 is a sectional view taken along a line 10—10 in FIG. 9;

FIG. 11 is a sectional view taken along a line 11—11 in FIG. 9;

FIG. 12 is an enlarged view of an encircled portion indicated by reference numeral 12 in FIG. 9.

DESCRIPTION OF THE PREFERRED EMBODIMENTS

The present invention will now be described by way of embodiments in connection with the accompanying drawings.

Figure 1:
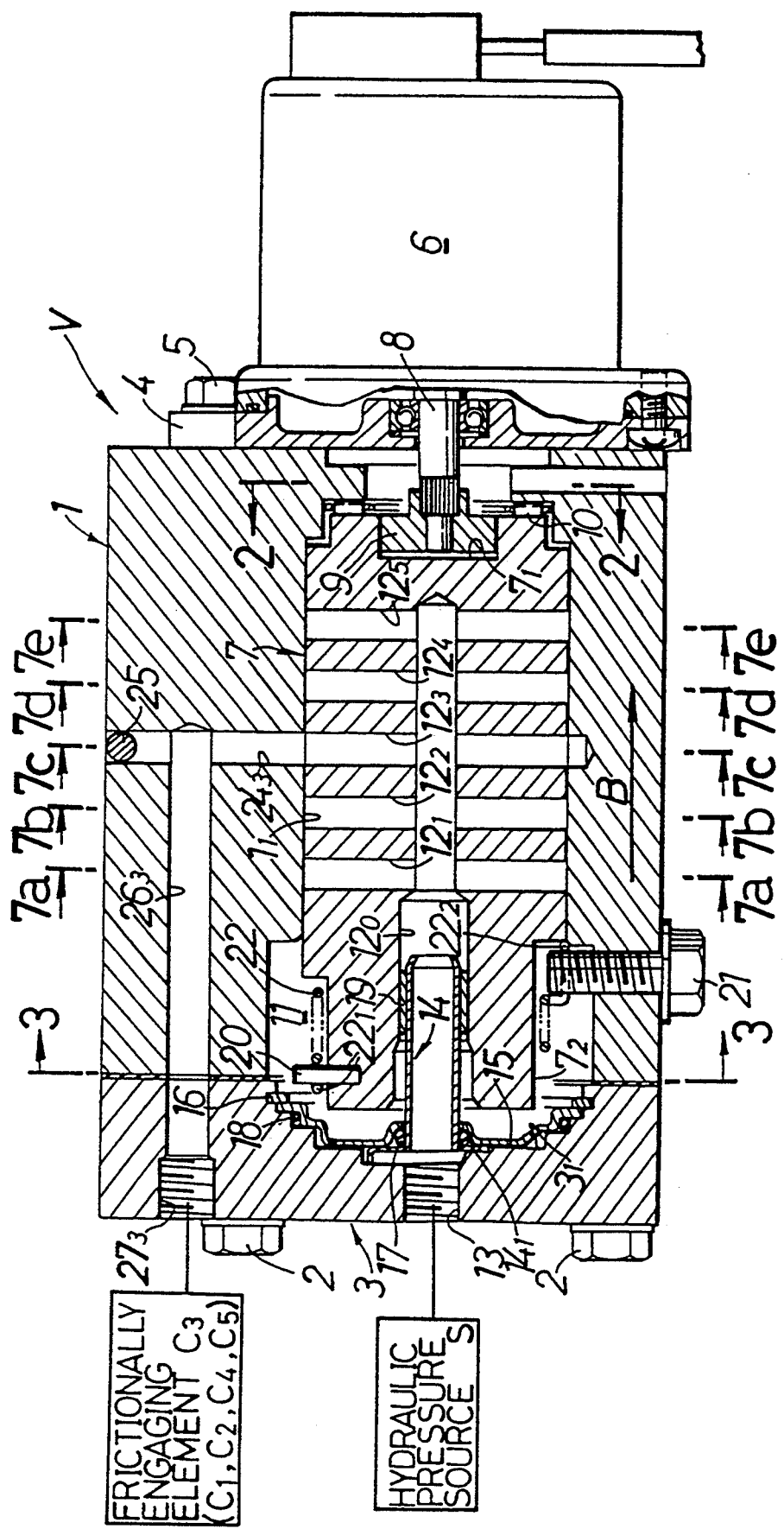

In FIG. 1, reference character V is a rotary valve for an automatic transmission, which functions to selectively supply a hydraulic pressure from a hydraulic pressure source S fed to valve V to each of a plurality of frictionally engaging elements $C_1$ to $C_5$ to cause the automatic transmission for an automobile to which valve V is attached to shift to a desired gear shift stage.

Rotary valve V is comprised of valve housing 1 having valve bore $1_1$ with a circular section at a central portion, cover plate 3, secured by a plurality of bolts 2, to close an opening at a left end of valve housing 1, pulse motor 6, as an actuator, secured to a right end of valve housing 1 by a plurality of bolts 5 passed through mounting flange 4, and a substantially columnar spool 7, rotatably received in valve bore $1_1$ in valve housing 1 and rotatively driven by pulse motor 6.

Figure 2:
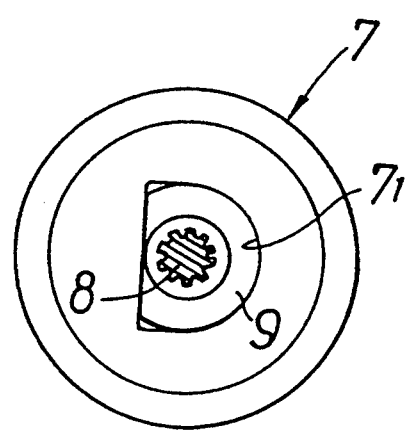

As best seen by reference to FIGS. 1 and 2, D-shaped chamfered connecting member 9 is spline-coupled to a tip end of output shaft 8 of pulse motor 6 extending into valve housing 1. D-shaped connecting member 9 is engaged in D-shaped recess $7_1$, FIG. 1, in a right end face of spool 7. Thus, spool 7 can be rotated, through a predetermined angle within valve bore $1_1$ in valve housing 1 by pulse driving pulse motor 6. Thrust bearing 10 is mounted between the right end face of spool 7 and an inner wall surface of valve housing 1. Loads, which urge the spool 7 rightwardly when free rotation of spool 7 is permitted, are received by thrust bearing 10.

Figure 3:
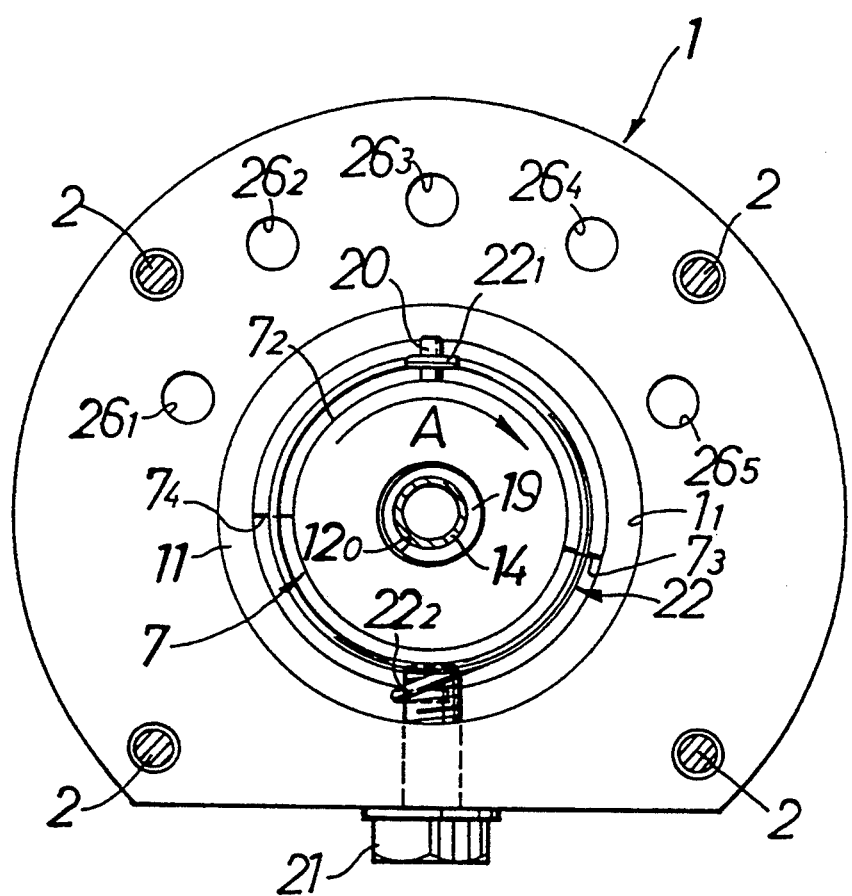

As can be seen from FIGS. 1 and 3, smaller-diameter portion $7_2$ is formed at a left end of spool 7, FIG. 1, to define annular space 11 between smaller-diameter portion $7_2$ and valve bore $1_1$. Oil passage $12_0$ extends through the rotary shaft of spool 7 and opens into the left end face of spool 7, FIG. 1. Recess $3_1$, FIG. 1, is provided in cover plate 3 in opposed relation to the left end face of spool 7. Input port 13, opening into recess $3_1$, connects valve V to the hydraulic pressure source S. Input port 13 and oil passage $12_0$ in spool 7 are interconnected through feed pipe 14. More specifically, flange $14_1$, formed at a left end of feed pipe 14, FIG. 1, is fitted into recess $3_1$ and urged and fixed by annular retainer 15 and clip 16. In this case, a pair of sealing members 17 and 18 are mounted between recess $3_1$ and retainer 15. On the other hand, a right end of the feed pipe 14 is inserted into oil passage $12_0$ in spool 7 through bushing 19. This ensures that line pressure supplied to the input port 13 from the hydraulic pressure source S can be supplied through feed pipe 14 into oil passage $12_0$ in spool 7.

Figure 5:
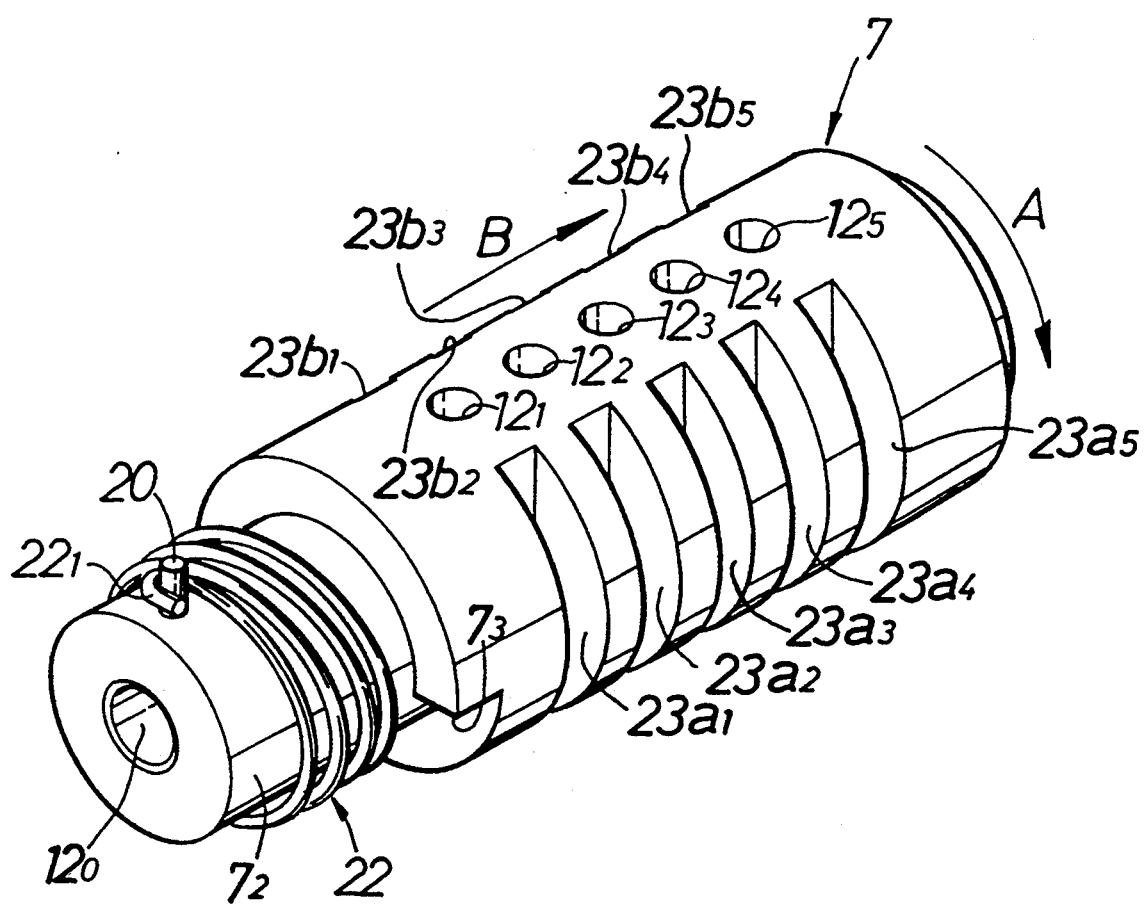

As can be seen by reference to FIG. 5 in addition to FIGS. 1 to 3, radially extending pin 20 is embedded into the smaller-diameter portion $7_2$ of spool 7, while a bolt 21, FIG. 1, is threadedly inserted into valve housing 1 with its tip end reaching the interior of annular space 11. Engage portions $22_1$ and $22_2$ are formed at opposite ends of coil spring 22, received in the annular space 11, and are retained between pin 20 and bolt 21. Coil spring 22 is mounted with a load previously provided thereto so as to bias spool 7 in a clockwise rotational direction (a direction indicated by an arrow A in FIGS. 3 and 5) and also in an axial direction (a direction indicated by an arrow B in FIGS. 1 and 5). A pair of steps $7_3$ and $7_4$, FIG. 3, are formed at a right end of smaller-diameter portion $7_2$, and one of steps $7_3$ is adapted to engage bolt 21 to define an end of rotation of spool 7, when spool 7 is rotated by resilient force of coil spring 22.

Figure 6:
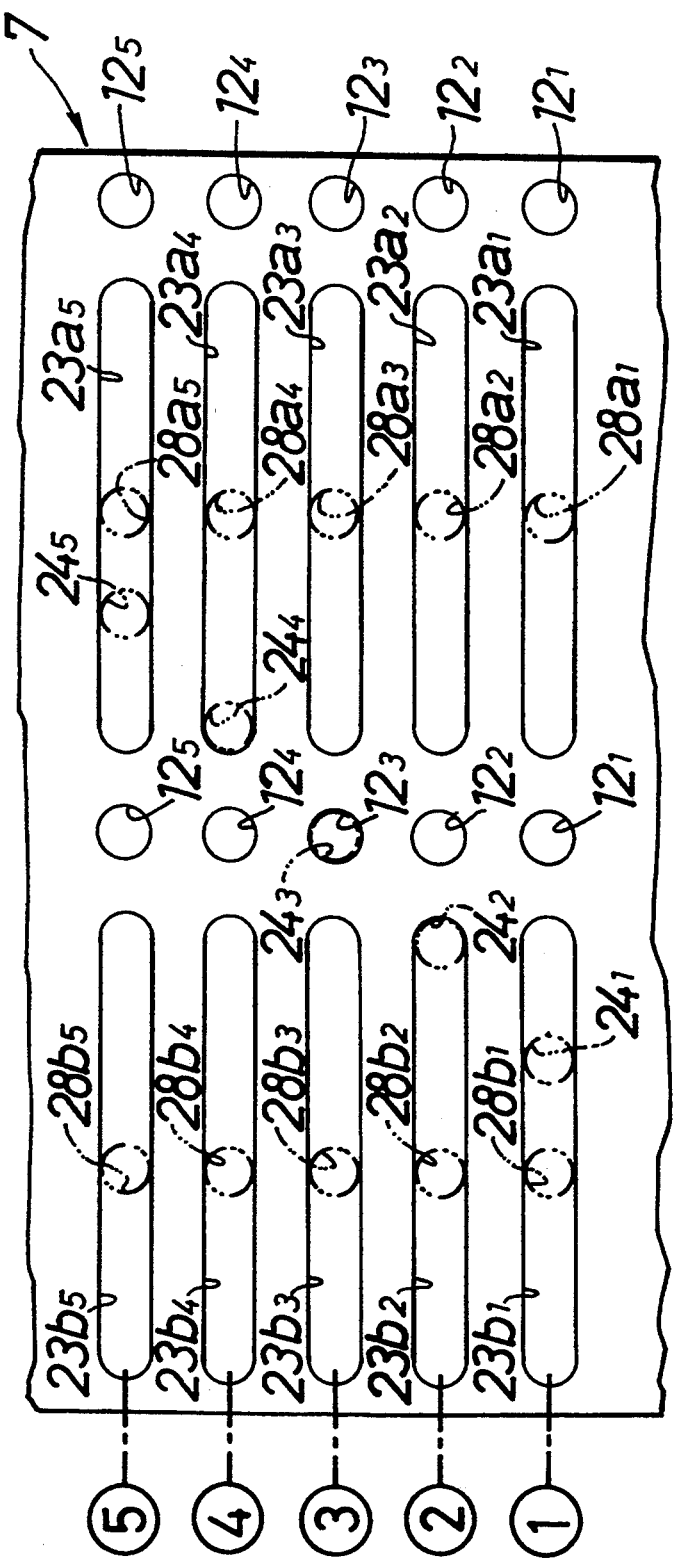

As can be seen from FIGS. 1, 5 and 6, spool 7 has five parallel oil passages $12_1$ to $12_5$ provided therein in an axially parallel arrangement and diametrically passed therethrough to communicate with oil passage $12_0$. Spool 7 also has a series of downshifting drain grooves $23a_1$ to $23a_5$ and a series of upshifting drain grooves $23b_1$ to $23b_5$ circumferentially provided in an outer peripheral surface thereof in a sandwiching relation to five oil passages $12_1$ to $12_5$.

As can be seen from FIGS. 1, 3 and 7a to 7e, five oil passages $24_1$ to $24_5$ are radially provided in valve housing 1 in correspondence to five oil passages $12_1$ to $12_5$ provided in axially parallel arrangement in spool 7. Oil passages $24_1$ to $24_5$ are radially formed at distances from one another in an axial direction of the valve bore $1_1$ and at different phases through a predetermined angle, and an opening at an outer end thereof is occluded by plug 25. Oil passages $24_1$ to $24_5$ communicate with output ports $27_1$ to $27_5$ opened in cover plate 3 through oil passages $26_1$ to $26_5$ axially provided in valve housing 1. Output ports $27_1$ to $27_5$ are connected to frictionally engaging elements $C_1$ to $C_5$ of the automatic transmission, not shown, for establishing first to fifth gear shift stages (only the frictionally engaging element $C_3$ for the third gear shift stage being diagrammatically shown in FIG. 1), respectively.

As shown in FIGS. 7a to 7e, downshifting drain ports $28a_1$ to $28a_5$ and upshifting drain ports $28b_1$ to $28b_5$ are provided in pairs in valve housing 1 on a diametrical line and opened into valve bore $1_1$. Downshifting drain ports $28a_1$ to $28a_5$ always communicate with downshifting drain grooves $23a_1$ to $23a_5$ within a range of rotation during operation of spool 7, and upshifting drain ports $28b_1$ to $28b_5$ likewise always communicate with upshifting drain grooves $23b_1$ to $23b_5$ within a range of rotation during operation of spool 7. Outer ends of drain ports $28a_1$ to $28a_5$ and $28b_1$ to $28b_5$ communicate with downshifting hydraulic pressure control means Vd and upshifting hydraulic pressure control means Vu for adjusting the hydraulic pressure released from these drain ports. Each of hydraulic pressure control means Vd and Vu is comprised, for example, of a solenoid valve, an orifice, or a combination of a solenoid valve and an orifice. Downshifting hydraulic pressure control means Vd operates to expedite releasing of hydraulic pressure from frictionally engaging elements $C_2$ to $C_5$ while upshifting hydraulic pressure control means Vu operates to retard releasing of hydraulic pressure from frictionally engaging elements $C_1$ to $C_4$.

The first embodiment of the present invention having the above-described construction will be described below.

When spool 7 is, for example, in a position corresponding to a third gear shift, as shown in FIGS. 1 and 7c (such position being referred to as a third gear shift position hereinafter), line pressure supplied to input port 13 from hydraulic pressure source S is passed through feed pipe 14 to oil passage $12_0$, axially provided in spool 7, and transmitted from oil passage $12_0$ through radially extending oil passage $12_3$, oil passage $24_3$ radially extending in valve housing 1 and oil passage $26_3$, axially extending in valve housing 1, to output port $27_3$. This causes frictionally engaging element $C_3$ of the automatic transmission, not shown, connected to output port $27_3$ to be operated to establish the third gear shift stage. During this time, the other four output ports $27_1$, $27_2$, $27_4$ and $27_5$ are connected to drain ports $28b_1$, $28b_2$, $28a_4$ and $28a_5$, formed in valve housing 1, through oil passages $26_1$, $26_2$, $26_4$ and $26_5$; $24_1$, $24_2$, $24_4$ and $24_5$ and the drain grooves $23b_1$, $23b_2$, $23a_4$ and $23a_5$ formed in spool 7. In other words, when spool 7 is in the third gear shift position, input port 13 is connected only to output port $27_3$ of the five output ports $27_1$ to $27_5$.

When upshifting, for example, from the third gear shift stage to the fourth gear shift stage is desired, spool 7 is driven clockwise, in the direction of arrow A in FIG. 7c by pulse motor 6 for rotation to a fourth gear shift position shown in FIG. 7d. Then, input port 13 is put out of communication with output port $27_3$ and, at the same time, newly connected to output port $27_4$, through oil passages $12_0$ and $12_4$ in spool 7 and oil passages $24_4$ and $26_4$ in valve housing 1, so that line pressure is supplied to hydraulically engaging element $C_4$, thus establishing the fourth gear shift stage in the automatic transmission. As shown in FIG. 8a, the hydraulic pressure for hydraulically engaging element $C_3$ to which the line pressure has been supplied theretofore is released from upshifting drain port $28b_3$ through output port $27_3$, the oil passages $26_3$ and $24_3$ and the upshifting drain groove $23b_3$. During this time, the releasing of the hydraulic pressure entering upshifting drain port $28b_3$ is retarded by the upshifting hydraulic pressure control means Vu and, hence, the co-engagement of both the hydraulically engaging element $C_3$ for the third gear shift and the hydraulically engaging element $C_4$ for the fourth gear shift is produced, thereby moderating the shifting shock during upshifting. Even when the upshifting from any gear shift stage is conducted, spool 7 is certainly rotated in the direction of arrow A and, therefore, the hydraulic pressure for corresponding one of hydraulically engaging elements $C_1$ to $C_4$ which has been in engagement theretofore is always released into corresponding one of upshifting drain ports $28b_1$ to $28b_4$, thus providing an effect similar to that described above.

To the contrary, when downshifting, for example, from the third gear shift stage to the second gear shift stage is desired, spool 7 is driven in a counterclockwise direction, indicated by an arrow C in FIG. 7c, by the pulse motor 6 for rotation to a second gear shift position shown in FIG. 7b. Input port 13, FIG. 1, is put out of communication with output port $27_3$ and, at the same time, newly connected to output port $27_2$ through oil passages $12_0$ and $12_2$ in spool 7 and oil passages $24_2$ and $26_2$ in valve housing 1, so that the line pressure is supplied to hydraulically engaging element $C_2$ of the transmission, not shown, thus establishing the second gear shift stage in the automatic transmission. As shown in FIG. 8b, the hydraulic pressure for hydraulically engaging element $C_3$, to which the line pressure has been supplied theretofore, is released from the downshifting drain port $28a_3$ through the output port $27_3$, FIG. 1, oil passages $26_3$ and $24_3$ and downshifting drain groove $23a_3$. The releasing of the hydraulic pressure for downshifting port $28a_3$ is expedited by the downshifting hydraulic pressure control means Vd and, hence, a neutral condition is temporarily produced, ensuring that the number of revolutions of engine can be increased to a proper extent. This makes it possible to moderate the shifting shock during downshifting. For the downshifting, the spool 7 is necessarily rotated in the counterclockwise direction, as shown by the arrow C even during the downshifting from any gear shift stage. Therefore, the hydraulic pressure for corresponding one of hydraulically engaging elements $C_2$ to $C_5$, which has been in engagement theretofore, is always released into corresponding one of downshifting drain ports $28a_2$ to $28a_5$, thus providing an effect similar to that described above.

When rotary valve V is in operation in the above-described manner, the line pressure from hydraulic pressure source S is supplied through input port 12 and feed pipe 14 to oil passage $12_0$, axially formed in spool 7, so that spool 7 is urged rightwardly as viewed in FIG. 1 by the line pressure. During this time, side force on spool 7 is eliminated, because radial oil passage $12_1$ to $12_5$, communicating with central oil passage $12_0$, are defined axially symmetrically to diametrically extend through spool 7. This cause no radial urging of spool 7 thereby avoiding a large frictional force between spool 7 and valve bore $1_1$ in valve housing 1. Spool 7 is also urged rightwardly by the force of coil spring 22, but axially rightward load is received by thrust bearing 10 mounted at the right end, FIG. 1, of spool 7 and, therefore spool 7 can be smoothly rotated by a slight driving force. Moreover, spool 7, biased rightwardly, is axially positioned by means of thrust bearing 10 and, hence, oil passages $12_1$ to $12_5$ in spool 7 are automatically aligned with oil passages $24_1$ to $24_5$ in valve housing 1. In addition, the line pressure supplied through feed pipe 14 to spool 7 is sealed by bushing 19 mounted between feed pipe 14 and oil passage $12_0$. Moreover, such line pressure is supplied from the axial end of spool 7 and, therefore, a short-circuiting between oil passage $12_0$ and the other oil passages $12_1$ to $12_5$ is prevented.

Figure 4:
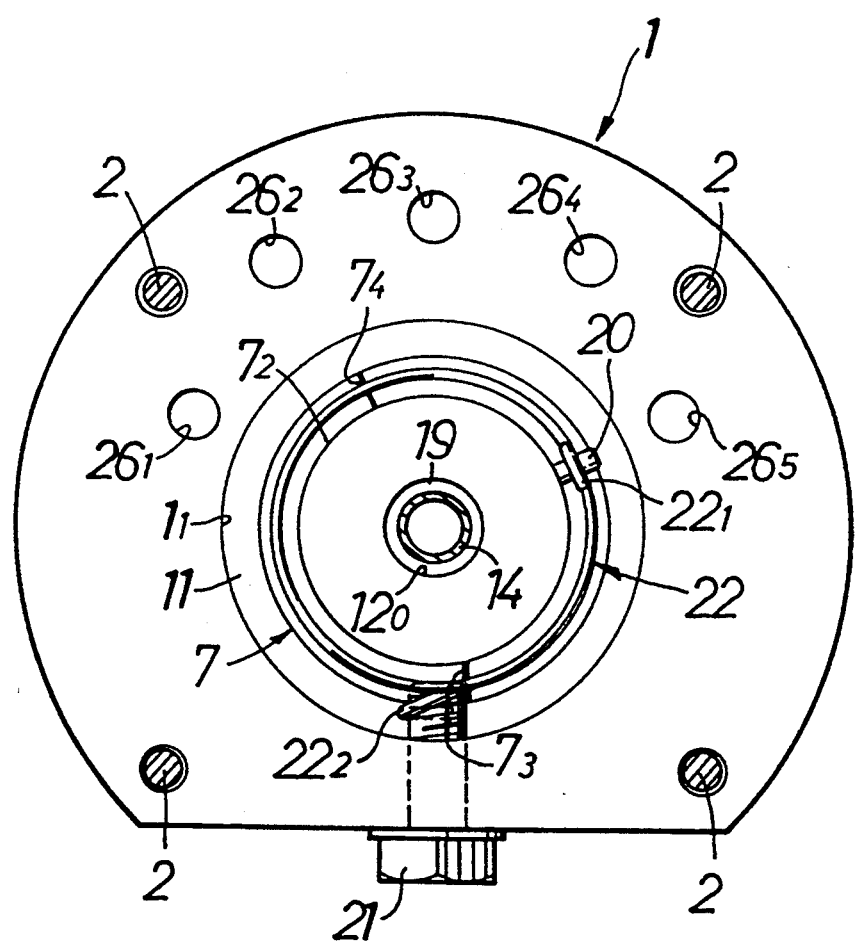

If pulse motor 6 should break down and fail to drive spool 7, spool 7 is rotated by the resilient force of coil spring 22, mounted between spool 7 and valve housing 1, and stopped at a position shown in FIG. 4 in which the step $7_3$, formed in spool 7, abuts against bolt 21, i.e., at a position corresponding to a fifth gear shift, the highest gear shift stage of the automatic transmission, not shown. Even when spool 7 is not rotated smoothly, due to a malfunction of pulse motor 6 or a clogging with dust, spool 7 can be automatically rotated to the fifth gear shift position by detecting an abnormality, by a proper sensor, to cut off the energization of pulse motor 6.

It should be noted that the target position to which spool 7 is rotated by the force of coil spring 22 is not limited to fifth gear shift position and may be a position corresponding to a higher gear shift, e.g., a position corresponding to a fourth gear shift. If rotary valve V has a neutral position, spool 7 may be rotated toward such neutral position.

When each of the hydraulic pressure control means Vd and Vu is comprised of an orifice, in the above-described embodiment, if the orifice of the downshifting hydraulic pressure control means Vd is of a relatively large diameter, while the orifice of the upshifting hydraulic pressure control means Vu is of a relatively small diameter, it is possible to retard the dropping of the hydraulic pressure during upshifting and to expedite the dropping of the hydraulic pressure during downshifting, by the operation of such orifices. Further, both orifices can be connected, at their downstream portions to a common oil passage, and a solenoid valve can be provided in such common oil passage, thereby finely adjusting the dropping characteristic of hydraulic pressure. With such construction, the dropping characteristic of hydraulic pressure can be, of course, insured by the operation of the orifices, even if the solenoid valve breaks down.

A second embodiment of the present invention will be described below in connection with FIGS. 9 to 12.

Figure 10:
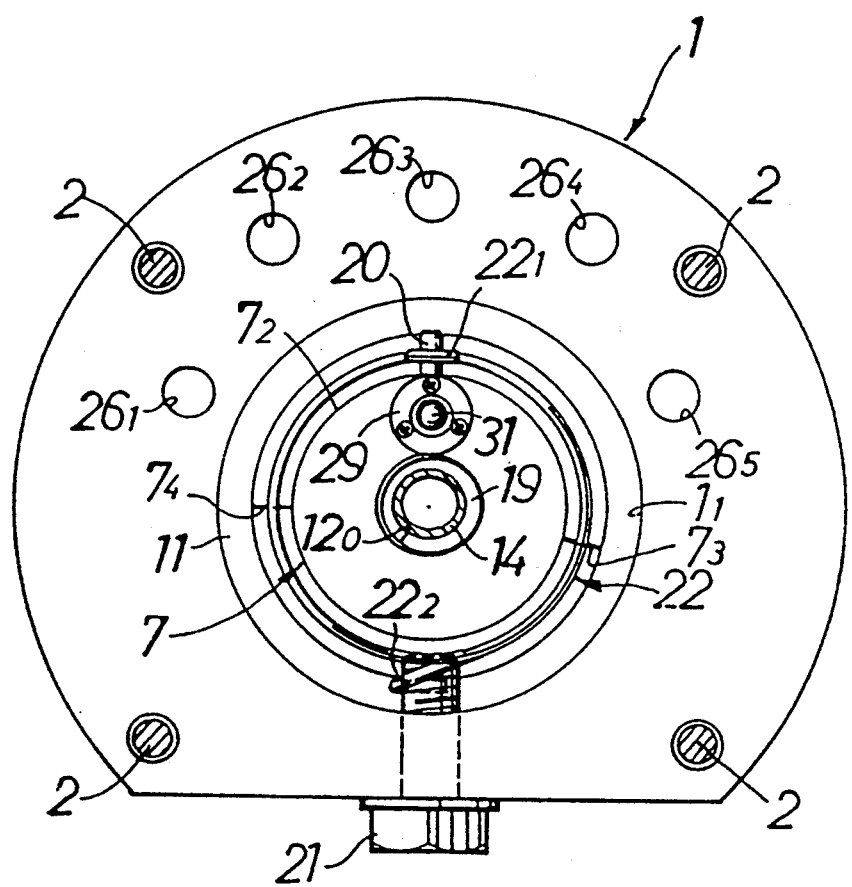
Figure 11:
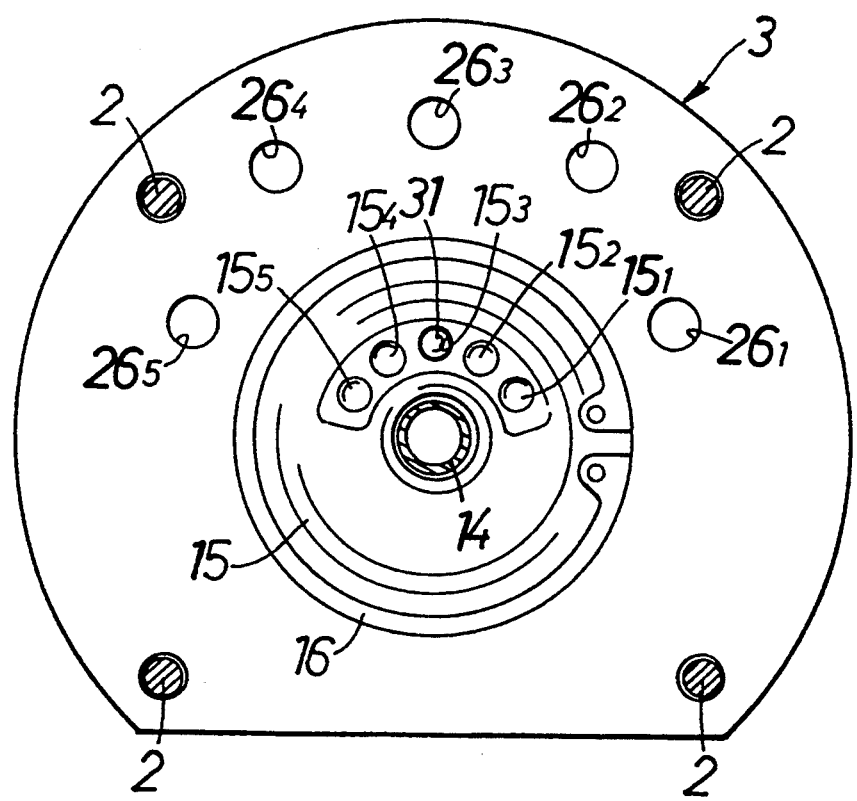
Figure 12:
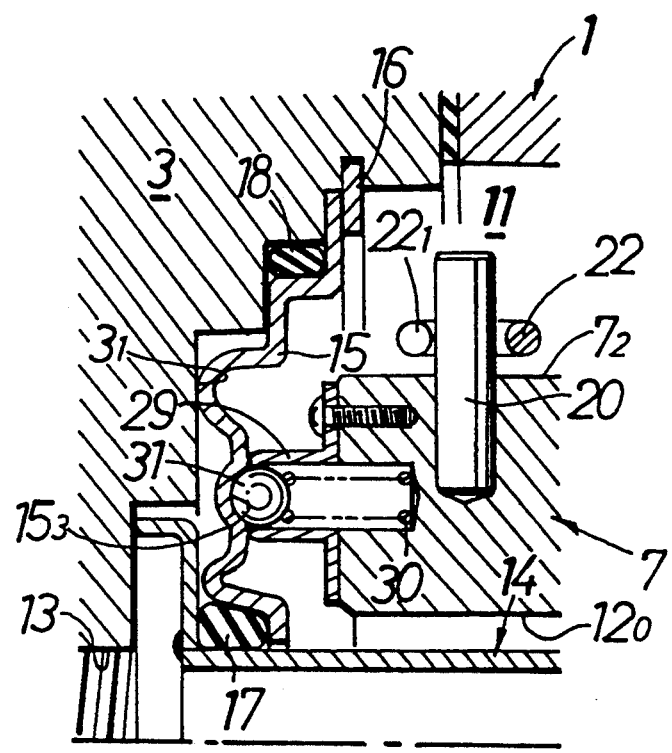

In this embodiment, coil spring 22 has not an axial preset load, but has only a preset load in a rotational direction. Ball carrying member 29, FIGS. 9 and 10, is mounted on a left end face of spool 7, and a ball 31, FIG. 10, is carried in ball carrying member 29 and biased leftwardly, as viewed in FIG. 12, by a force of spring 30. On the other hand, retainer 15, mounted to cover plate 3, has five recesses $15_1$ to $15_5$ circumferentially provided therein and engageable by ball 31. A click stop mechanism is formed by ball 31 biased by spring 30 and recesses $15_1$ to $15_5$ in retainer 15.

With this embodiment, when spool 7 is stopped at any of the first to fifth gear shift positions, ball 31 engages one of the recesses $15_1$ to $15_5$ to precisely position spool 7. Moreover, spool 7 is biased rightwardly by reaction of resilient force of spring 30 urging ball 31 and, hence, spool 7 can be urged against thrust bearing 10 in cooperation with a rightward load by the line pressure and, thus, positioned axially. It will be appreciated that even if ball 31 may be carried in valve housing 1 and engaged into a recess provided in spool 7, a similar operational effect can be obtained.

Although the embodiments of the present invention have been described above, it will be understood that the present invention is not limited to these embodiments, and various minor modifications in design can be made without departing from the scope of the invention defined in claims.

What is claimed is

1. A rotary valve for an automatic transmission comprising a spool rotatably received within a valve housing and driven by an actuator for selectively supplying hydraulic pressure from a hydraulic pressure source to each of a plurality of frictionally engaging elements through said spool, wherein
said rotary valve includes a central oil passage formed in said spool and extending along an axis of rotation of said spool,
pairs of radial oil passages formed in said spool and extending symmetrically about said central oil passage on respective diametrical lines, an oil supply port opened into an axial end of said central oil passage, and a feed pipe connected at one end to said hydraulic pressure source and inserted at the other end into said central oil passage, wherein said spool is rotatable relative to said feed pipe.

2. A rotary valve for an automatic transmission comprising:
a spool rotatably received within a valve housing and driven by an actuator for selectively supplying hydraulic pressure from a hydraulic pressure source to each of a plurality of frictionally engaging elements through said spool;
a central oil passage formed in said spool and extending along an axis of rotation of said spool;
pairs of radial oil passages formed in said spool and radially extending symmetrically about said central oil passage on respective diametrical lines;
an oil supply port opened into an axial end of said central oil passage;
a feed pipe connected to said hydraulic pressure source and connected to said central oil passage; and
a bushing mounted between an outer periphery of said feed pipe and an inner periphery of said central oil passage in said spool.

3. A rotary valve for an automatic transmission, comprising:
a spool rotatably received within a valve housing and rotatably driven by an actuator for selectively supplying hydraulic pressure from a hydraulic pressure source to each of a plurality of frictionally engaging elements through said spool; and
a resilient biasing means provided at an axial end of said spool for biasing said spool in a rotational direction thereof, wherein said resilient biasing means comprise a coil spring having opposite ends engaged with a locking portion provided in said spool and a locking portion provided in said valve housing, respectively.

4. A rotary valve for an automatic transmission according to claim 3, wherein said locking portion provided in said valve housing also serves as a stopper for defining an end of rotation of said spool.

5. A rotary valve for an automatic transmission according to any of claims 3 to 4, wherein the rotational position of said spool biased by said resilient biasing means corresponds to a neutral or higher gear shift stage of said automatic transmission.

6. A rotary valve for an automatic transmission, comprising a spool rotatably received within a valve housing and rotatively driven by an actuator for selectively supplying hydraulic pressure from a hydraulic pressure source to each of a plurality of frictionally engaging elements through said spool, wherein
said rotary valve includes a first drain port communicatable with selected one of frictionally engaging elements of an automatic transmission when said spool is rotated from a predetermined position for permitting the supply of said hydraulic pressure to said selected frictionally engaging element to a position for permitting the supply of the hydraulic pressure to another of said frictional engaging element for a higher gear shift, and a second drain port communicatable with said selected frictionally engaging element, when the spool is rotated from said predetermined position to a position for permitting the supply of the hydraulic pressure to another of said frictionally engaging element for a lower gear shift, said first and second drain ports being provided independently from each other, wherein said rotary valve includes a central oil passage formed along an axis of rotation of said spool, and a plurality of radial oil passages even spaced along the axis of rotation of said spool; and a supply means for supplying hydraulic pressure from said hydraulic pressure source into one end of said central oil passage along an axis of said central oil passage.

7. A rotary valve for an automatic transmission according to any of claim s 3 to 4, wherein said resilient biasing means is capable of biasing said spool in the axial direction.

* * * * *